United States Patent
Payne et al.

(10) Patent No.: US 10,797,548 B2
(45) Date of Patent: Oct. 6, 2020

(54) HYBRID MODULE INCLUDING MOTOR ROTOR CLAMP RING STAKED TO ROTOR HUB

(71) Applicant: Schaeffler Technologies AG & Co. KG, Herzogenaurach (DE)

(72) Inventors: Matthew Payne, Glenmont, OH (US); Markus Steinberger, Macedonia, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 196 days.

(21) Appl. No.: 15/844,238

(22) Filed: Dec. 15, 2017

(65) Prior Publication Data
US 2019/0190334 A1    Jun. 20, 2019

(51) Int. Cl.
| | | |
|---|---|---|
| *H02K 1/28* | (2006.01) | |
| *H02K 1/27* | (2006.01) | |
| *B60K 6/26* | (2007.10) | |
| *H02K 1/18* | (2006.01) | |
| *H02K 7/00* | (2006.01) | |
| *H02K 5/173* | (2006.01) | |
| *H02K 15/03* | (2006.01) | |

(52) U.S. Cl.
CPC .............. *H02K 1/28* (2013.01); *B60K 6/26* (2013.01); *H02K 1/18* (2013.01); *H02K 1/278* (2013.01); *H02K 1/2786* (2013.01); *H02K 1/2793* (2013.01); *H02K 7/006* (2013.01); *H02K 5/173* (2013.01); *H02K 15/03* (2013.01)

(58) Field of Classification Search
CPC ................................. H02K 1/278; H02K 1/28
See application file for complete search history.

(56) References Cited

U.S. PATENT DOCUMENTS

| | | | | |
|---|---|---|---|---|
| 1,192,404 | A * | 7/1916 | Ewart ................... | F16C 35/063 403/261 |
| 2,421,115 | A * | 5/1947 | Carlson ................. | H02K 1/28 29/598 |
| 8,622,182 | B2 * | 1/2014 | Iwase ................... | B60K 6/26 180/65.26 |
| 2006/0273683 | A1 | 12/2006 | Caprio et al. | |
| 2009/0179516 | A1 | 7/2009 | Bailey | |
| 2009/0289519 | A1 | 11/2009 | Yanagisawa et al. | |
| 2015/0222164 | A1 | 8/2015 | Hippen et al. | |
| 2016/0084363 | A1 | 3/2016 | Steinberger et al. | |
| 2016/0105060 | A1 | 4/2016 | Lindemann et al. | |

OTHER PUBLICATIONS

Corresponding Search Report for PCT/US2018/064804.

* cited by examiner

*Primary Examiner* — Dang D Le
(74) *Attorney, Agent, or Firm* — Davidson, Davidson & Kappel, LLC

(57) ABSTRACT

An electric motor includes a rotor, a stator for rotationally driving the rotor and a rotor carrier hub for supporting the rotor on an outer circumferential surface thereof. The rotor carrier hub includes a groove on the outer circumferential surface. The electric motor also includes a clamping ring configured for holding the rotor axially in place on the rotor carrier hub. The clamping ring being fixed on the outer circumferential surface of the rotor carrier hub by at least one inner radial protrusion of the clamping ring extending into contact with the rotor carrier hub in the groove.

20 Claims, 5 Drawing Sheets

HYBRID MODULE INCLUDING MOTOR ROTOR CLAMP RING STAKED TO ROTOR HUB

The present disclosure relates generally to electric motor rotors and more specifically to electric motor rotors in hybrid modules.

BACKGROUND

Hybrid motor vehicle drive trains include a hybrid module having an electric motor rotor carrier hub that is typically a forged material with higher ductility allowing the staking process to work. Other methods of clamping the rotor are use of threads and a nut such as in Ford's HF35 transmission. Aisin uses another method where they deform the hub up around the rotor end ring.

U.S. Pub. No. 2016/0105060A1 shows a method of staking the hub to retain the end ring.

SUMMARY OF THE INVENTION

An electric motor includes a rotor, a stator for rotationally driving the rotor and a rotor carrier hub for supporting the rotor on an outer circumferential surface thereof. The rotor carrier hub includes a groove on the outer circumferential surface. The electric motor also includes a clamping ring configured for holding the rotor axially in place on the rotor carrier hub. The clamping ring being fixed on the outer circumferential surface of the rotor carrier hub by at least one inner radial protrusion of the clamping ring extending into contact with the rotor carrier hub in the groove.

Embodiments of the electric motor may include one or more of the following features:
the clamping ring includes at least one staked indentation formed in an axially facing radially extending surface thereof;
a non-ferrous plate axially between the clamping ring and the rotor, the clamping ring axially pressing the non-ferrous plate against the rotor to hold the rotor axially in place;
the rotor carrier hub includes an axially extending section and a radially extending section extending radially outward from the axially extending section, the rotor being sandwiched between the clamping ring and the radially extending section;
the rotor is non-rotatably connected to the outer circumferential surface of the rotor carrier hub by a plurality of splines, the splines including a first section having a first outer diameter for supporting the rotor and a second section having a second outer diameter for supporting the clamping ring, the first outer diameter being greater than the second outer diameter;
the groove is formed in sections of each of the splines;
the clamping ring is a metal; or
the metal is bronze or a high strength low alloy.

A hybrid module configured for arrangement in the torque path upstream from a transmission and downstream from an internal combustion engine is also provided. The hybrid module includes a hybrid drive unit including an input shaft configured for connecting to the internal combustion engine, the electric motor and a clutch. The hybrid module also includes a torque converter fixed to the electric motor. The clutch is configured for selectively connecting torque converter to the input shaft or disconnecting the torque converter from the input shaft.

A method of forming an electric motor is also provided. The method includes providing a clamping ring onto a rotor carrier hub such that the clamping ring covers a groove formed in an outer circumferential surface of the rotor carrier hub; and staking the clamping ring such that material of the clamping ring protrudes into the groove so as to axially fix the clamping ring in place on the rotor carrier hub.

Embodiments of the method may include one or more of the following features:
forming the groove into splines formed the outer circumferential surface of the rotor carrier hub;
non-rotatably fixing a rotor onto the outer circumferential surface of the rotor carrier hub, the clamping ring fixing the rotor axially in place on the rotor carrier hub;
the material protrudes radially into the groove upon axially staking of an axially facing radially extending surface of the clamping ring;
the staking includes contacting the axially facing radially extending surface of the clamping ring with an inclined surface of a staking tool;
the clamping ring is a metal;
the metal is bronze or a high strength low alloy;
heating the clamping ring before placing the clamping ring onto the rotor carrier hub, the clamping ring fixing rotor axially in place on the rotor carrier hub after the cooling of the clamping ring.

BRIEF DESCRIPTION OF THE DRAWINGS

The present invention is described below by reference to the following drawings, in which.

DETAILED DESCRIPTION

The present disclosure provides a method of fixing a rotor clamp ring to a rotor carrier hub. The present disclosure involves plastically deforming the rotor clamp ring into a machined groove in the cast rotor carrier hub. In some embodiments, the rotor clamp ring is heated before installation, causing it to expand, the rotor clamp ring shrinks after installation. In other embodiments, the rotor clamp ring is not heated for installation. In preferred embodiments, the rotor clamp ring is made of a material with sufficient ductility such that it can be staked axially to be deformed radially inwardly and with sufficient strength that it can be staked with sufficient force—i.e., to deform the material elastically a sufficient amount—to clamp the rotor and form a spring element that continues maintain a residual clamp load on the rotor after the staking. In preferred embodiments, the clamp ring is formed of a non-ferrous metal, which may be bronze, or HSLA (high strength low alloy) steel. In one preferred embodiment, the rotor clamp ring is made of 060XLF, which has higher strength than for example a AISI 1020 steel. AISI 1020 steel would not allow such a residual clamping load as it would plastically axially deform under the same geometry constraints and would not be able to clamp the rotor axially in place with a preload.

Figure 1:
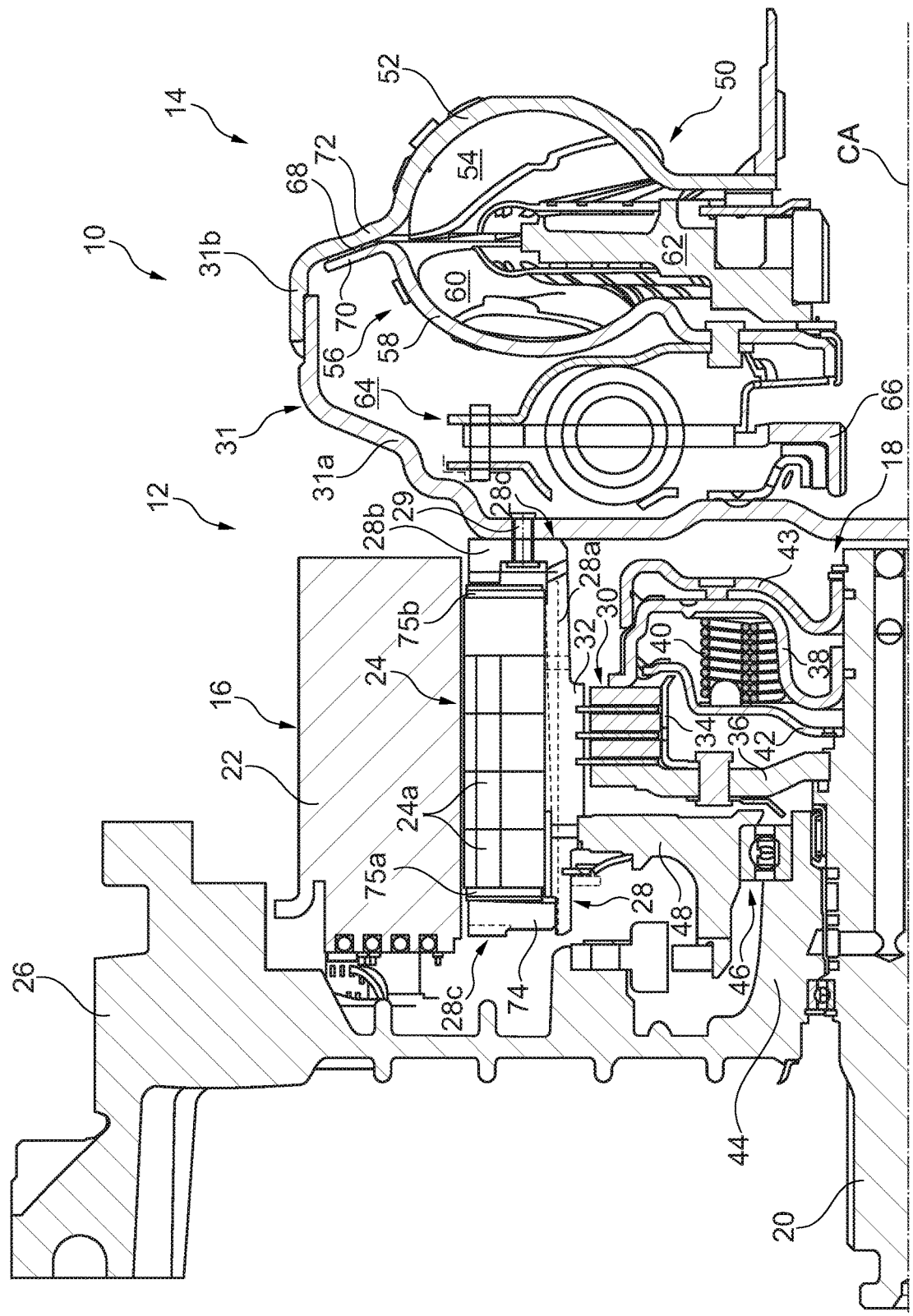
FIG. 1 shows a hybrid module in accordance with an embodiment of the present invention.

FIG. 1 shows hybrid module 10 in accordance with an embodiment of the present invention. Module 10 includes a hybrid drive unit 12 configured for attachment to an internal combustion engine and a torque converter 14 configured for attachment to a transmission input shaft. In a known manner, hybrid drive unit 12 is selectively operable to transmit torque from the internal combustion engine to torque converter 14 or directly drive torque converter 14 via an electric motor 16 of drive unit 12. Along these lines, hybrid drive unit 12 includes an engine connect/disconnect clutch 18 for selectively connecting torque converter 14 to an input shaft 20, which is configured for non-rotatably connecting for example via a flywheel to a crankshaft of the internal combustion engine, or disconnecting torque converter 14 from input shaft 20 such that torque converter can be driven solely by electric motor 16.

Electric motor 16 includes a stator 22 and a rotor 24, with stator 22 being fixed to a housing 26 of hybrid drive unit 12. Upon current being provided to coils of stator 22, rotor 24 is rotated about a center axis CA of hybrid module 10 in a known manner, due to rotor 24 including a plurality of permanent magnet segments 24a that are energized by the current in the coils. The terms axially, radially and circumferentially as used herein are used with respect to center axis CA. Magnet segments 24a are supported at their inner circumferences by a rotor carrier hub 28. Rotor carrier hub 28 includes a cylindrical axially extending section 28a supporting the inner circumferences of magnet segments 24a and a radially extending section 28b protruding radially outward from an end of axially extending section 28a. Torque converter 14 is fixed to hybrid drive unit 12 at radially extending section 28b of rotor carrier hub 28 by a plurality of fasteners 29 passing through a cover 31 of torque converter 14.

Clutch 18 includes a plurality of clutch plates 30, at least some of which are supported in an axially slidable manner at outer diameter ends thereof by splines 32 formed on an inner circumferential surface of axially extending section 28a. At least one of clutch plates 30 are supported in an axially slidable manner at inner diameter ends thereof by an inner support 34 that is fixed to a counter pressure plate 36, which is nonrotatably fixed to shaft 20. Clutch 18 further includes a piston 38 that is axially slidable along an outer circumference of shaft 20 to engage and disengage clutch 18 based on fluid pressure differences on front and rear sides of piston 38. When piston 38 forces clutch plates 30 against counter pressure plate 36, clutch 18 is engaged and torque from shaft 20 is transmitted through clutch plates 30 into rotor carrier hub 28, which then transmits the received torque to damper assembly 14. Piston 38 is held axially away from clutch plates 30 by a spring 40 supported by a support plate 42. Piston 38 is also resiliently connected to a liftoff control plate 43 that limits the liftoff of piston 38 with respect to clutch plates 30.

Housing 26 includes an axially extending protrusion 44 provided on an engine side of clutch 18 radially outside of shaft 20. Protrusion 44 supports a ball bearing 46, which rotatably supports a rotor flange 48 on protrusion 44. An inner race of ball bearing 46 sits on an outer circumferential surface of protrusion 44 and rotor flange 48 extends from an outer circumferential surface of the outer race of ball bearing 46 to axially extending section 28a of rotor carrier hub 28.

Torque converter 14 includes a front cover 31a and a rear cover 31b together forming cover 31, with fasteners 29 passing axially through a radially extending section of front cover 31a, which extends radially inward to intersect center axis CA. Rear cover 31b includes forms an impeller shell 50 of an impeller 52 that includes a plurality of impeller blades 54, which are supported by a rounded blade supporting portion 50a of impeller shell 50, which is shaped as an annular bowl and contacts rear edges of impeller blades 54.

Torque converter 14 also includes a turbine 56 configured to define a piston that is axially moveable toward and away from impeller shell 50 such that an engagement section of turbine 56 engages an engagement section of impeller shell 50 so as to form a lockup clutch. Turbine 56 includes a turbine shell 58 supporting a plurality of turbine blades 60. Torque converter 14 also includes a stator 62 axially between turbine 56 and impeller 52 to redirect fluid flowing from the turbine blades 60 before the fluid reaches impeller blades 54 to increase the efficiency of torque converter 14. Torque converter 14 further includes a damper assembly 64 fixed to turbine shell 58. Damper assembly 64 is configured for receiving torque from turbine shell 58 and transferring torque to the transmission input shaft. For transferring torque to the transmission input shaft, damper assembly 64 includes a support hub 66, which includes a splined inner circumferential surface for non-rotatably connecting to an outer circumferential surface of the transmission input shaft.

A friction material 68 is bonded onto a radially extending impeller facing surface of an outer radial extension 70 of turbine shell 58, which is radially outside of blades 60 and forms the engagement section of turbine 56, for engaging a radially extending wall 72 of impeller shell 50, which is radially outside of blades 54 and forms the engagement section of impeller shell 50. In other embodiments, instead of or in addition to being bonded to outer radial extension 70, friction material 68 may be bonded to radially extending turbine facing surface of radially extending wall 72 or to one or more additional discs between radially extension 70 and wall 72. Regardless of whether friction material 68 is bonded to outer radial extension 70, radially extending wall 72 or one or more additional discs, friction material 68 is provided axially between extension 70 and wall 72 to selectively rotationally engage the engagement section of turbine piston 56 with the engagement section of impeller shell 50. Torque converter 14 receives torque input from hybrid drive unit 12 through fasteners 29 at front cover 31a, which is transmitted to impeller 52. Impeller 52 drives turbine 56 via fluid flow from impeller blades 54 to turbine blades 60, when the lockup clutch is disengaged, or via friction material 68, when the lockup clutch is engaged. Turbine 56 then drives damper assembly 64, which in turn drives the transmission input shaft.

Figure 4:
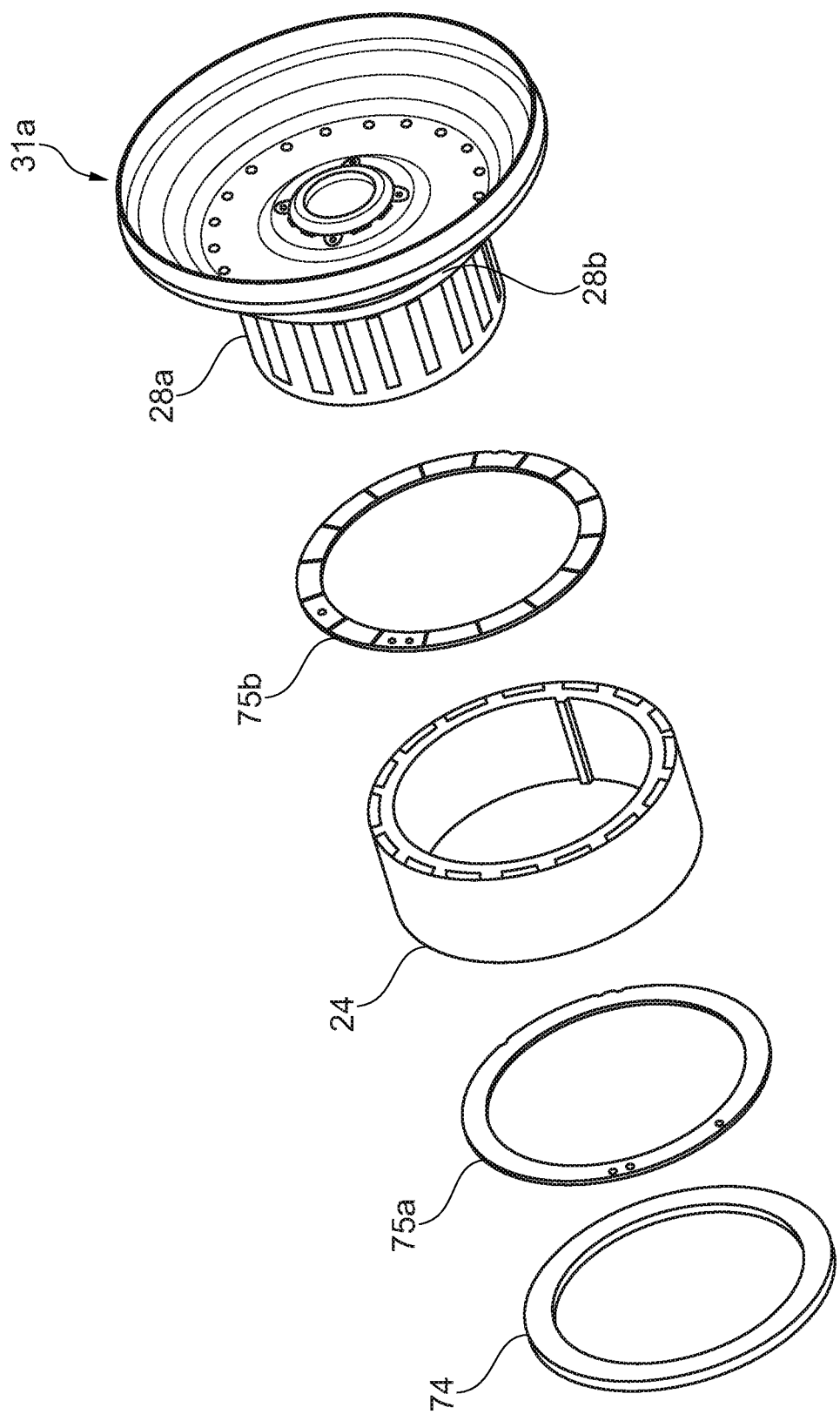
FIG. 4 shows an exploded view illustrating a rotor, a clamping ring, plates, a hub and a front cover of the hybrid module of FIG. 1.

Referring back to electric motor 16, it further includes a rotor clamping ring 74 fixed to axially extending section 28a for axially retaining rotor 24 on rotor carrier hub 28. Rotor clamping ring 74 is provided at a first axial end 28c of rotor carrier hub 28 that is opposite to a second axial 28d of rotor carrier hub 28 at which radially extending section 28b is provided, such that magnets 24a are clamped axially between section 28b and ring 74. A first non-ferrous plate 75a is provided axially between rotor 24 and ring 74 and a second non-ferrous plate 75b is provided axially between rotor 24 and section 28b. Plates 75a, 75b may be formed of aluminum and contact the rotor magnets to block eddy currents, which are essentially short circuits of the magnetic flux field and lead to low e-motor efficiency. As noted above, rotor clamping ring 74 is formed of a HSLA material such as 060XLF. FIG. 4 shows an exploded view illustrating rotor 24, clamping ring 74, plates 75a, 75b, hub 28 and front cover 31a.

Figure 2A:
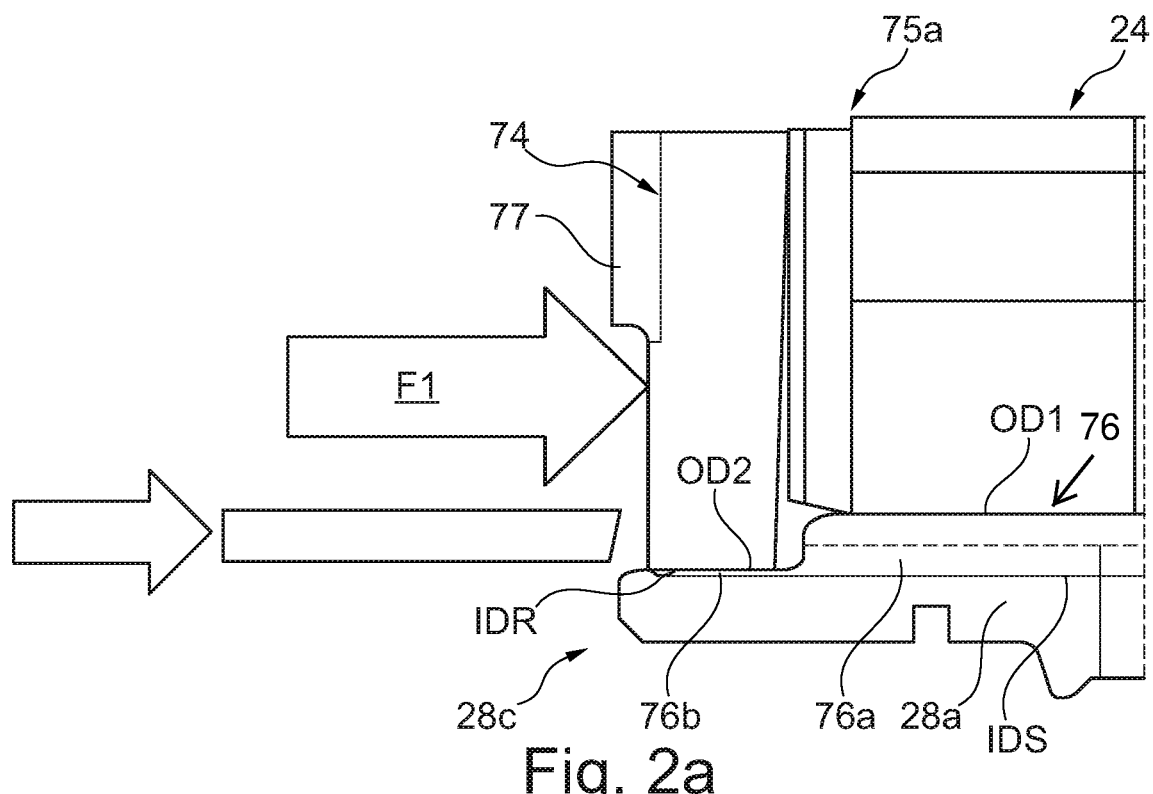
FIGS. 2a to 2c illustrate the fixing of a rotor clamping ring of the hybrid module onto a rotor carrier hub in accordance with an embodiment of the present invention.
Figure 3A:
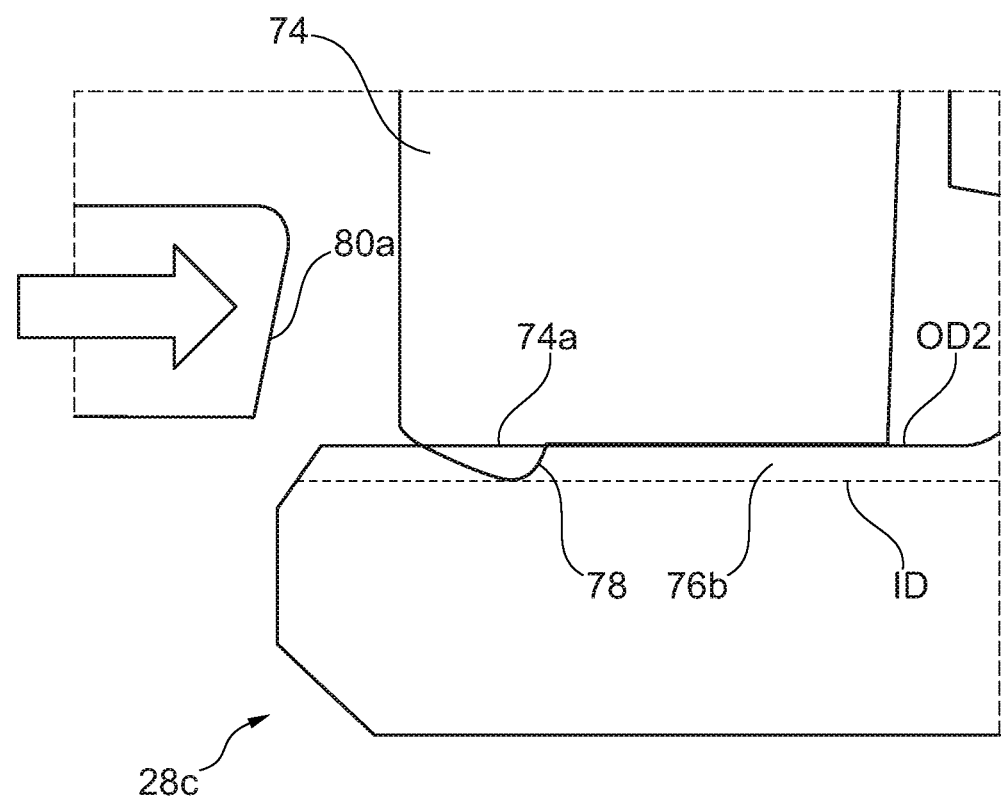
FIGS. 3a to 3c illustrate enlarged views of the views shown in FIGS. 2a to 2c, respectively.
Figure 2B:
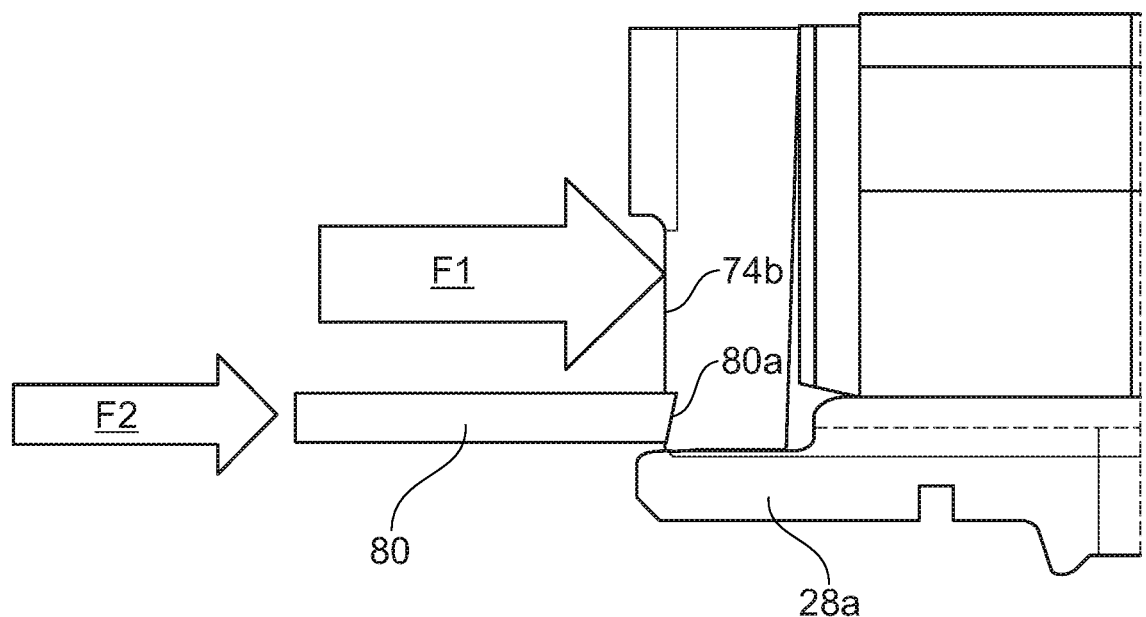
Figure 3B:
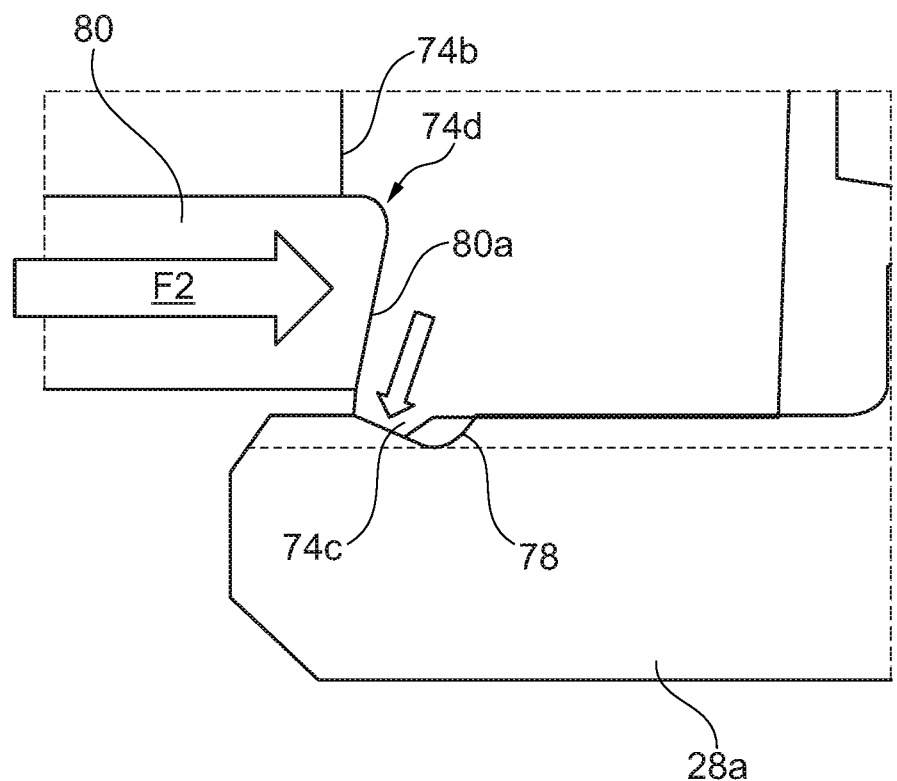
Figure 2C:
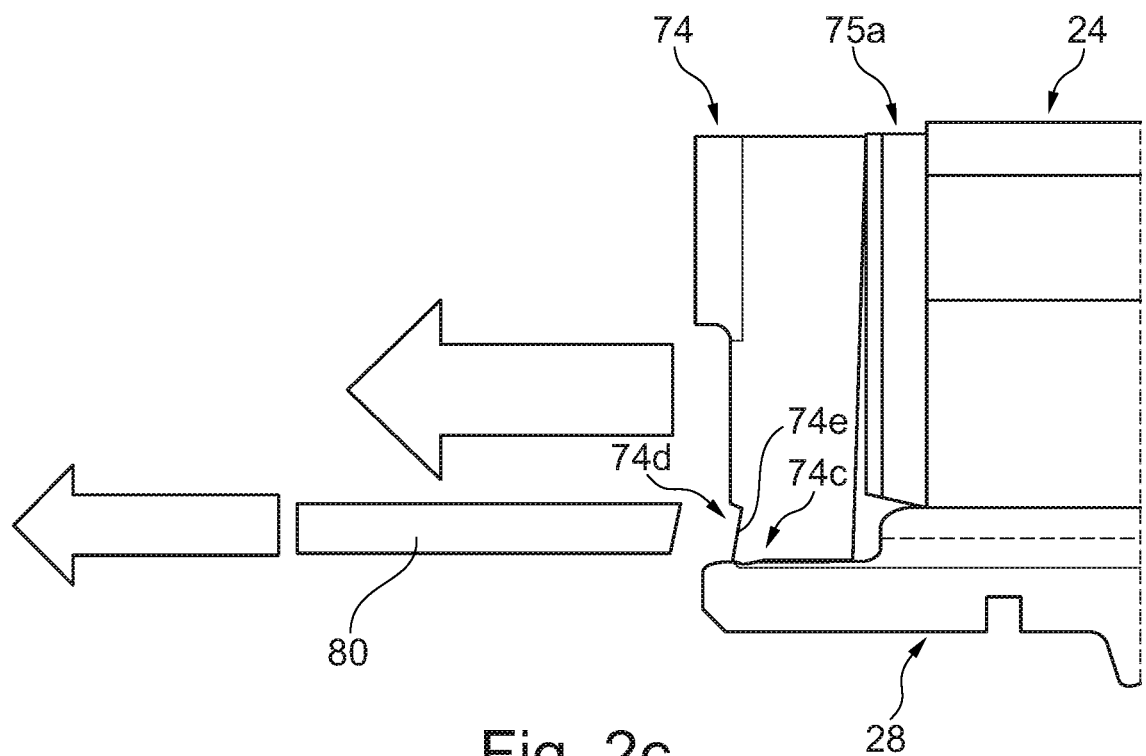
Figure 3C:
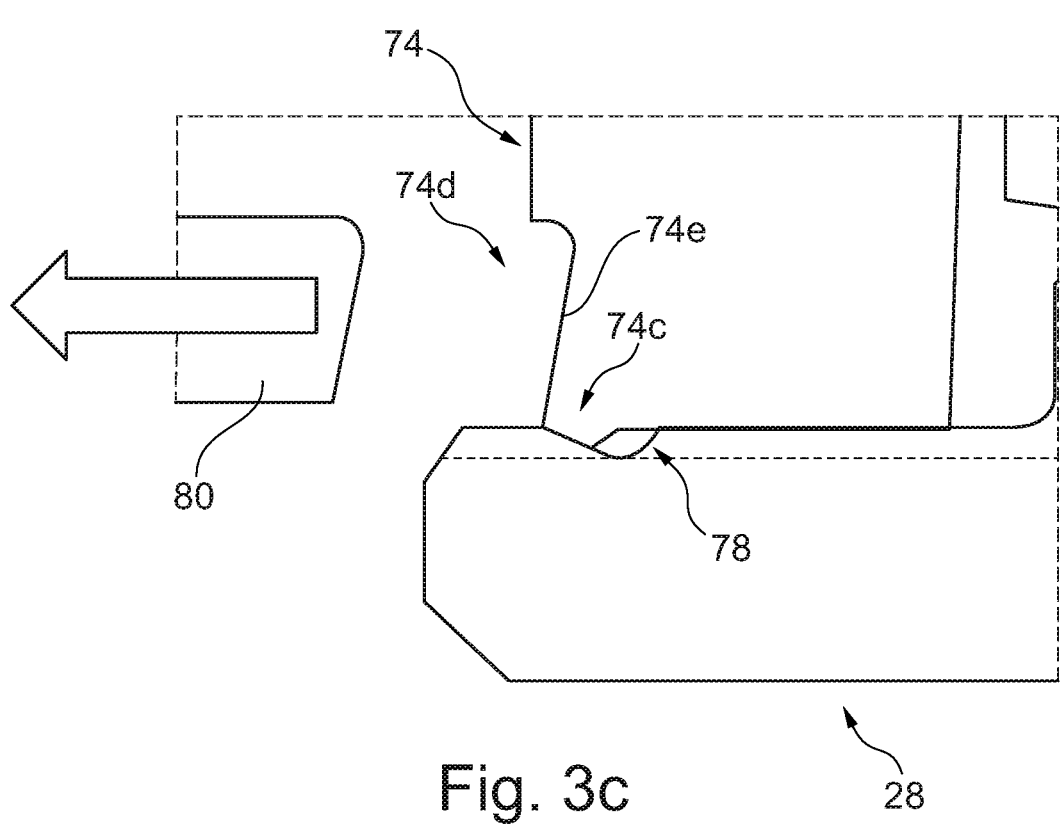

FIGS. 2a to 2c illustrate the fixing of rotor clamping ring 74 onto rotor carrier hub 28 in accordance with an embodiment of the present invention, while FIGS. 3a to 3c illustrate enlarged view of the view shown in FIGS. 2a to 2c, respectively. Rotor clamping ring 74 is first heated to a predetermined temperature of for example at least 325° C. The ring 74 is heated such that an inner diameter IDR of ring 74 expands enough to slip onto hub 28. Next, as shown in FIGS. 2a, 3a, clamping ring 74 is slid axially via an axial force F1 onto axially extending section 28a of rotor carrier hub 28 at axial end 28c to axially press against non-ferrous plate 75a positioned axially between rotor 24 and clamping ring 74. Section 28a of rotor carrier hub 28 is provided with a plurality of circumferentially spaced axially extending splines 76 at the outer circumferential surface thereof. Splines 76 each include a first section 76a having a first outer diameter OD1 and a second section 76b having a second outer diameter OD2, with outer diameter OD1 being greater than outer diameter OD2. Both sections 76a, 76b of splines 76 have an inner diameter IDS. Rotor 24 is non-rotatably fixed in place on rotor carrier hub 28 via first sections 76a of splines 76. Clamping ring 74, which upon heating has an inner diameter IDR that is smaller than outer diameter OD2, is slid on rotor carrier hub 28 onto sections 76b of splines 76. As shown in FIG. 3a, axially extending section 28a of hub 28 is provided with a circumferentially extending groove 78 on the outer circumferential surface thereof. More specifically, each of splines 76 is provided with a section of groove 78 at spline section 76b. Each section of groove 78 extends radially inward from outer diameter OD2 in to the respective spline 76 at section 76b. Clamping ring 74 is provided in axial alignment with groove 78 directly radially outside or groove 78 such that the sections of groove 78 are covered by the inner circumferential surface 74a of clamping ring 74. Clamping ring 74 includes an annular protrusion 77 at a front side thereof, an arc portion of which is machined after clamping ring 74 is installed for proper balancing.

Next, as shown in FIGS. 2b, 3b, while the rotor clamping ring 74 is being held on axially extending section 28a and against plate 75a via force F1 over groove 78, an axially facing radially extending surface 74b of clamping ring 74 is staked with an axial force F2 via a staking tool 80, with force F2 being applied in the same direction as force F1, to form at least one indentation 74d in surface 74b. The staking of clamping ring 74 displaces material 74c of clamping ring 74 radially inward into groove 78. Material 74c protrudes radially inward from inner circumferential surface 74a of clamping ring 74 to contact axially extending section 28a in groove 78 and generate a form-fitting connecting between ring 74 and rotor carrier hub 28 that holds ring 74 axially place on axially extending section 28a. In the embodiment shown in FIGS. 2a to 2c and 3a to 3c, staking tool 80 includes an inclined contact surface 80a for contacting surface 74b of ring 74. Surface 80a is configured such that when tool 80 is moved axially parallel to center axis CA (FIG. 1), surface 80a forms a non-perpendicular angle with respect to center axis CA and provides a radially inward force component on ring 74 to help generate the movement of material 74c radially inward into groove 78. In one preferred embodiment, staking tool 80 includes a plurality of circumferentially spaced surfaces 80a for generating a plurality of circumferentially spaced indentations 74d and the same number of material protrusions 74c as indentations 74d.

As shown in FIGS. 2c, 3c, after indentations 74d and material protrusions 74c are formed and ring 74 sufficiently cools, ring 74 is held by force F1 until ring 74 cools. In some preferred embodiments, ring 74 is held by force F1 until ring 74 is at ambient temperature or approximately 20° C. Staking force F2 can be removed prior to force F1. Ring 74 is held axially in place on rotor carrier hub 28 by protrusions 74c being fixed in groove 78 after staking tool 80 is moved back axially away from ring 74 and ring 74 is no longer held by force F1 against plate 75a. In other words, after ring 74 cools, protrusions 74c permanently fixes ring 74 axially in place on axially extending section 28a of hub 28 by the interlocking fit of protrusions 74c in groove 78 such that ring 74 elastically presses rotor 24 against carrier hub section 28b. Ring 74 axially forces plate 75a against rotor 24 to clamp rotor 24 in place on hub 28. FIG. 3c illustrates that inclined surface 80a of staking tool 80 creates indentation 74d such that indentation 74d includes a radially extending surface 74e that is axially tapered such that surface 74e forms a non-perpendicular angle with respect to center axis CA (FIG. 1).

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
F1 first axial force
F2 second axial force
OD1 first outer diameter
OD2 second outer diameter
IDR ring inner diameter
IDS spline inner diameter
10 hybrid module
12 hybrid drive unit
14 torque converter
16 electric motor
18 engine connect/disconnect clutch
20 input shaft
22 stator
22a outer circumferential surface
24 rotor
24a magnet segments
26 housing
28 rotor carrier hub
28a cylindrical axially extending section
28b radially extending section
28c first axial end
28d second axial end
29 fasteners
30 clutch plates
31 cover
31a front cover
31b rear cover
32 splines
34 inner support
36 counter pressure plate
38 piston
40 spring
42 support plate
43 liftoff control plate
44 housing protrusion
46 ball bearing
48 rotor flange
50 impeller shell
50a rounded blade supporting portion
52 impeller 54 impeller blades
56 turbine
58 turbine shell
60 turbine blades
62 stator
64 damper assembly
66 support hub
68 friction material
70 outer radial extension
72 radially extending wall
74 rotor clamping ring
74a inner circumferential surface
74b axially facing radially extending surface
74c radially inner material protrusion
74d indentation
74e inclined indentation surface
75a non-ferrous plate
75b non-ferrous plate
76 axially extending splines
76a first spline section
76b second spline section
77 protrusion
78 circumferentially extending groove
80 staking tool
80a inclined staking tool surface

What is claimed is:

1. An electric motor comprising:
a rotor;
a stator for rotationally driving the rotor;
a rotor carrier hub for supporting the rotor on an outer circumferential surface thereof, the rotor carrier hub including a groove on the outer circumferential surface; and
a clamping ring configured for holding the rotor axially in place on the rotor carrier hub, the clamping ring being fixed on the outer circumferential surface of the rotor carrier hub by at least one inner radial protrusion of the clamping ring extending into contact with the rotor carrier hub in the groove, the clamping ring having an inner diameter non-rotatably joined with the rotor carrier hub independent of the groove, the at least one inner radial protrusion extending radially inward from the inner diameter into the groove.

2. The electric motor as recited in claim 1 wherein the clamping ring includes at least one staked indentation formed in an axially facing radially extending surface thereof.

3. The electric motor as recited in claim 1 further comprising a non-ferrous plate axially between the clamping ring and the rotor, the clamping ring axially pressing the non-ferrous plate against the rotor to hold the rotor axially in place.

4. The electric motor as recited in claim 1 wherein the rotor carrier hub includes an axially extending section and a radially extending section extending radially outward from the axially extending section, the rotor being sandwiched between the clamping ring and the radially extending section.

5. The electric motor as recited in claim 1 wherein the clamping ring is a metal.

6. The electric motor as recited in claim 5 wherein the metal is bronze or a high strength low alloy.

7. A hybrid module configured for arrangement in the torque path upstream from a transmission and downstream from an internal combustion engine, the hybrid module comprising:
a hybrid drive unit including an input shaft configured for connecting to the internal combustion engine, the electric motor as recited in claim 1 and a clutch; and
a torque converter fixed to the electric motor, the clutch configured for selectively connecting torque converter to the input shaft or disconnecting the torque converter from the input shaft.

8. The hybrid module as recited in claim 7 wherein the rotor carrier hub is fixed to the torque converter by a plurality of fasteners.

9. A method of constructing the electric motor as recited in claim 1, the method comprising:
providing the clamping ring onto the rotor carrier hub such that the clamping ring covers the groove formed in the outer circumferential surface of the rotor carrier hub; and
staking the clamping ring such that material of the clamping ring protrudes into the groove so as to axially fix the clamping ring in place on the rotor carrier hub.

10. The method as recited in claim 9 further comprising forming the groove into splines formed the outer circumferential surface of the rotor carrier hub.

11. The method as recited in claim 9 further comprising non-rotatably fixing the rotor onto the outer circumferential surface of the rotor carrier hub.

12. The method as recited in claim 9 wherein the material protrudes radially into the groove upon axially staking of an axially facing radially extending surface of the clamping ring.

13. The method as recited in claim 12 wherein the staking includes contacting the axially facing radially extending surface of the clamping ring with an inclined surface of a staking tool.

14. The method as recited in claim 9 wherein the clamping ring is a metal.

15. The method as recited in claim 14 wherein the metal is bronze or a high strength low alloy.

16. The method as recited in claim 9 further comprising heating the clamping ring before placing the clamping ring onto the rotor carrier hub, the clamping ring fixing rotor axially in place on the rotor carrier hub after the cooling of the clamping ring.

17. The electric motor as recited in claim 1 wherein the inner diameter of the clamping ring is non-rotatably joined with the rotor carrier hub by splines on the rotor carrier hub.

18. An electric motor comprising:
a rotor;
a stator for rotationally driving the rotor;
a rotor carrier hub for supporting the rotor on an outer circumferential surface thereof, the rotor carrier hub including a groove on the outer circumferential surface; and
a clamping ring configured for holding the rotor axially in place on the rotor carrier hub, the clamping ring being fixed on the outer circumferential surface of the rotor carrier hub by at least one inner radial protrusion of the clamping ring extending into contact with the rotor carrier hub in the groove,
wherein the rotor is non-rotatably connected to the outer circumferential surface of the rotor carrier hub by a plurality of splines, the splines including a first section having a first outer diameter for supporting the rotor and a second section having a second outer diameter for supporting the clamping ring, the first outer diameter being greater than the second outer diameter.

19. The electric motor as recited in claim 18 wherein the groove is formed in sections of each of the splines.

20. An electric motor comprising:
a rotor;
a stator for rotationally driving the rotor;
a rotor carrier hub for supporting the rotor on an outer circumferential surface thereof, the rotor carrier hub including a groove on the outer circumferential surface;
a clamping ring configured for holding the rotor axially in place on the rotor carrier hub, the clamping ring being fixed on the outer circumferential surface of the rotor carrier hub by at least one inner radial protrusion of the clamping ring extending into contact with the rotor carrier hub in the groove; and
a non-ferrous metal plate axially between the clamping ring and the rotor, the clamping ring axially pressing the non-ferrous metal plate against the rotor to hold the rotor axially in place.

* * * * *